(No Model.)
W. RUDOLPH, Sr.
BREAST CHAIN FOR HARNESS.
No. 282,011. Patented July 24, 1883.
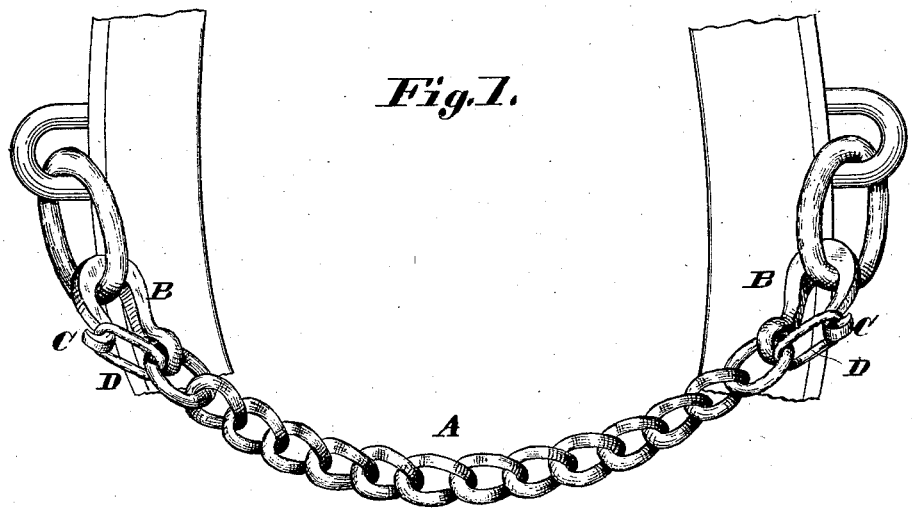
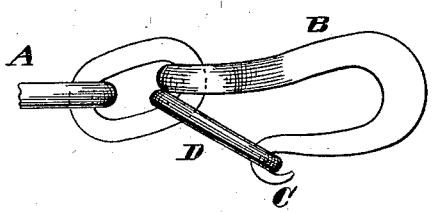
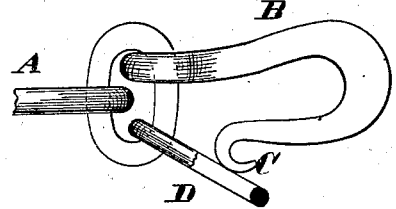
Attest:
Charles Pickles
Wm. J. Sayers
Inventor:
Wm Rudolph Sr
By Knight Bros
Attys

UNITED STATES PATENT OFFICE.

WILLIAM RUDOLPH, SR., OF ST. LOUIS, MISSOURI.

BREAST-CHAIN FOR HARNESS.

SPECIFICATION forming part of Letters Patent No. 282,011, dated July 24, 1883.

Application filed June 5, 1883. (No model.)

*To all whom it may concern:*

Be it known that I, WILLIAM RUDOLPH, Sr., of the city of St. Louis, in the State of Missouri, have invented a certain new and useful Improvement in Breast-Chains for Harness, of which the following is a full, clear, and exact description, reference being had to the accompanying drawings, forming part of this specification, and in which—

Figure 1 is a view showing the chain attached to the hames of a harness, and Figs. 2 and 3 are diagrams.

My invention relates to a breast-chain for harness, having hooks to connect it with the rings or staples of the hames; and my invention consists in a means for preventing the hooks from being accidentally disengaged from the rings or staples, and at the same time strengthening them, as will more fully appear hereinafter.

Referring to the drawings, A represents the chain, provided with hooks B B for connecting it with the rings or staples of the hames, as shown in Fig. 1. The ends of the hooks are turned up, forming additional small hooks or loops C, as shown. D D represent additional links secured in two of the links of the main chain, preferably the two end ones, in which the hooks are secured, which engage with the small hooks or loops C of the hooks proper when the chain is in use, as shown in Figs. 1 and 2. These links D are just of sufficient length to reach from the nearest part of the link with which they connect to the nearest part of the hooks or loops C, so that to engage them with the hooks C it is necessary to turn the links with which they connect into the position shown in Fig. 3, and then when the links are turned back to their natural position, where they will be held while the chain is in use, it will be impossible for the links D to be disengaged from the hooks or loops C, and thus, as will be understood from Fig. 1, the hooks proper cannot be accidentally disengaged from the hame rings or staples. These links D also serve to give great strength to the hooks proper when the chains are in use, for they will prevent all possibility, as illustrated fully in Fig. 2, of the hooks being opened out when excessive strain is brought upon them, and thus the links D serve the double purpose of strengthening the hooks B and preventing them from being accidentally disengaged from the hame rings or staples, and at the same time they can be easily, quickly, and conveniently disengaged from the hooks C when desired.

If desired, only one end of the chain need be provided with this described device and the other end be rigidly secured to the hame ring or staple.

I claim as my invention—

In a breast-chain for harness, the hook or hooks B, having turned end or ends, forming small hooks or loops C, and the link or links D, connected with the main chain, and adapted to be engaged with the small hook or hooks C, substantially as shown and described, for the purposes set forth.

WILLIAM RUDOLPH, SR.

In presence of—
GEO. H. KNIGHT,
SAML. KNIGHT.